(12) United States Patent
Cai

(10) Patent No.: US 8,516,772 B2
(45) Date of Patent: Aug. 27, 2013

(54) PRESSURE INJECTING CAULKING CONSTRUCTION TECHNIQUE FOR GAPS BETWEEN BUILDING DOOR/WINDOW HOLE AND COMMON ADDITIONAL FRAME OR SIDE FRAME

(75) Inventor: Xianci Cai, Guangdong (CN)

(73) Assignees: Shenzhen Fucheng Technology Development Co., Ltd., Shenzhen (CN); Shenzhen Fucheng Curtain Wall Decoration Engineering Co., Ltd., Shenzhen (CN)

( * ) Notice: Subject to any disclaimer, the term of this patent is extended or adjusted under 35 U.S.C. 154(b) by 0 days.

(21) Appl. No.: 13/265,494

(22) PCT Filed: Sep. 22, 2009

(86) PCT No.: PCT/CN2009/074100
§ 371 (c)(1),
(2), (4) Date: Oct. 20, 2011

(87) PCT Pub. No.: WO2010/121461
PCT Pub. Date: Oct. 28, 2010

(65) Prior Publication Data
US 2012/0037296 A1    Feb. 16, 2012

(30) Foreign Application Priority Data

Apr. 21, 2009  (CN) .......................... 2009 1 0106753
Apr. 21, 2009  (CN) .......................... 2009 1 0106754
Apr. 21, 2009  (CN) .......................... 2009 1 0106755

(51) Int. Cl.
| | | |
|---|---|---|
| B28B 7/00 | (2006.01) |
| E04B 1/00 | (2006.01) |
| E04G 21/00 | (2006.01) |
| E04G 23/00 | (2006.01) |
| E04C 1/00 | (2006.01) |
| E04B 1/76 | (2006.01) |
| C04B 111/00 | (2006.01) |
| E04C 3/28 | (2006.01) |
| E04B 1/24 | (2006.01) |

(52) U.S. Cl.
CPC ..... *E04B 1/7604* (2013.01); *C04B 2111/00482* (2013.01); *B28B 7/0029* (2013.01); *E04C 3/28* (2013.01); *E04B 1/24* (2013.01)
USPC ......... 52/742.13; 52/741.1; 52/309.4; 249/13

(58) Field of Classification Search
USPC .................. 52/741.1, 742.1, 742.13, 742.14, 52/741.15, 742.16, 204.1–217, 309.4, 309.5, 52/309.12, 309.17, 204.2, 205, 206, 207, 52/210, 211, 212, 213, 215, 216, 21, 309.177; 248/200, 205.1, 220.1, 309.1; 249/13, 39; 425/87, 256
See application file for complete search history.

(56) References Cited

U.S. PATENT DOCUMENTS 4,445,306 A * 5/1984 Schauffele ...................... 52/410
5,389,167 A * 2/1995 Sperber ............................. 156/71
(Continued)

*Primary Examiner* — William Gilbert
*Assistant Examiner* — Kyle Walraed-Sullivan
(74) *Attorney, Agent, or Firm* — Jackson IPG PLLC

(57) ABSTRACT

A pressure injecting caulking construction technique for gaps between building door/window hole (4) and common additional frame or side frame (1), which involves steps as follows. Firstly, positioning the common additional frame or side frame (1) of the building door/window in the hole (4). Secondly, the technique includes injecting insulating materials (7) in the middle of the gap (3) between the frame and hole, or installing occulting bars (2) at outer side of the additional framework or side framework, or installing combined frameworks (9) on the sides of the common additional frame or side frame and the wall of the hole. Lastly, the technique includes pressure injecting filling materials into the gap (3).

3 Claims, 5 Drawing Sheets

(56) References Cited

U.S. PATENT DOCUMENTS

| | | | |
|---|---|---|---|
| 5,673,883 A * | 10/1997 | Figueroa, Jr. | 248/200.1 |
| 6,026,628 A * | 2/2000 | Lopez | 52/745.09 |
| 6,330,768 B1 * | 12/2001 | Rodrigues | 52/202 |
| 6,485,800 B1 * | 11/2002 | Liittschwager et al. | 428/15 |
| 2001/0000088 A1 * | 4/2001 | Yetisener | 52/309.12 |
| 2007/0056230 A1 * | 3/2007 | Bren | 52/204.1 |
| 2008/0110110 A1 * | 5/2008 | Burton et al. | 52/213 |
| 2009/0077916 A1 * | 3/2009 | Scuderi et al. | 52/309.9 |

* cited by examiner

PRESSURE INJECTING CAULKING CONSTRUCTION TECHNIQUE FOR GAPS BETWEEN BUILDING DOOR/WINDOW HOLE AND COMMON ADDITIONAL FRAME OR SIDE FRAME

FIELD OF THE INVENTION

The present invention relates to a construction method, more particularly to a caulking construction technique for gaps between a common additional frame or side frame of a building door/window hole and a reserved hole.

BACKGROUND OF THE INVENTION

At present, specified gaps remain between the building door/window hole and the additional frame or side frame in order to obtain more accurate installation of the additional frame or side frame of building door/window. For the above gaps, the means of manual filling and plastering is adopted after internal components are fixed, in order to complete later caulking and surface treatment, and for larger gaps, construction personnel generally fill them with broken bricks or other impurities at first and then adopts the method of manual caulking and plastering, such a construction method has the deficiencies of slow construction progress, poor caulking compactness of the gaps and poor reliability, poor caulking compactness and reliability become the source of water seepage and leakage as well as inferior heat preservation and insulation, in addition, the broken bricks or other impurities in the gaps have poor cementation firmness with cement mortar and poor compactness, and the broken bricks or other impurities filled in the gaps are also liable to cause the deformation of the additional frame or side frame of door/window, thus having a severe impact on construction quality as well as safety and service life of building door/window, and creating hidden troubles for the building envelope structure of building door/window.

SUMMARY OF INVENTION

The present invention provides a pressure injecting caulking construction technique for gaps between a building door/window hole and a common additional frame or side frame, in this technique, the way of mechanical pressure injection is adopted in caulking, which not only improves the working efficiency, but also enhances the caulking compactness of gaps, prevents water seepage and leakage and raises the construction quality, therefore, water seepage and leakage and poor heat preservation and insulation in the caulking of the existing common additional frame or side frame of building door/window as well as the quality and safety problems in the connection between the common additional frame or side frame of building door/window and wall are solved.

In order to solve the above technical problems, the present invention provides a pressure injecting caulking construction technique for gaps between building door/window hole and common additional frame or side frame, which comprises the steps as follows:

B. firstly, putting a common additional frame or side frame of a building door/window in a building door/window hole, and accurately positioning the common additional frame or side frame of the building door/window;

E. injecting a filling material into a gap between the building door/window hole and the common additional frame or side frame by means of mechanical pressure, and completing post-treatment of gap opening.

Aiming at the characteristic of filling a middle isolation insulating material in the middle of gaps of door/window in northern cold areas, the present invention further provides a solution that the following step is carried out between the step B and the step E:

C. injecting middle isolation insulating materials in the middle of the gap between the common additional frame or side frame and the hole, and sequentially injecting the materials along the periphery of the common additional frame or side frame to entirely complete filling operations so that a continuous middle isolation zone is formed in the middle of the gap between the common additional frame and the side frame.

Aiming at the characteristic of installing water occulting bars in the middle of gaps of door/window in southern areas of heavy rainfall, the present invention further provides a solution that the following step is carried out before the step B:

installing occulting bars on the periphery of the common additional frame or side frame of the building door/window adjacent to the outer side of the common additional frame or side frame, wherein the occulting bars are continuously distributed along the periphery of the common additional frame or side frame.

Aiming at small common additional frame or side frame, the present invention further provides a solution that the following step is carried out after the step B:

D. installing a combined framework on the sides of the additional frame or side frame of the door/window and the wall of the hole, so that the edge of the framework at one side of the combined framework abuts against the inner side face of a reserved hole on the wall and the inner side faces of the frameworks in the combined framework are attached to the outer side surface of the additional frame or side frame.

The following step is carried out after the step E:

F. dismantling the combined framework after the filling material is cured or semi-cured.

The step E of injecting the filling material by means of mechanical pressure is completed at a time.

And under the situation that the middle isolation zone or the occulting bars are arranged in the middle, the step E is further divided into the sub-steps as follows:

E1, firstly, injecting the filling materials by means of mechanical pressure at one side of the middle isolation zone in the step C or of the occulting bars in the step A, and completing post-treatment of the gap opening at this side;

E2, then, injecting the filling materials by means of mechanical pressure at the other side of the middle isolation zone in the step C or of the occulting bars in the step A, and completing post-treatment of the gap opening at this side.

Also, in the step E, injecting the filling material by means of mechanical pressure at two sides of the middle isolation zone in the step C or of the occulting bars in the step A is completed simultaneously, and post-treatment of the gap openings at the two sides is simultaneously completed.

The middle isolation insulating material in the step C is insulating waterproof material, the insulating waterproof material further is foaming insulating waterproof filling material, and the filling material injected by means of mechanical pressure in the step E is cement mortar or caulking waterproof material.

And under the situation that the middle isolation zone is arranged in the middle, injecting the filling materials by means of mechanical pressure in the step E is carried out after the middle isolation insulating material in the step C is cured, or injecting the filling materials by means of mechanical pressure in the step E is carried out after the middle isolation insulating material in the step C is semi-cured, or the step E1 is carried out immediately after the injection of the middle isolation insulating material in the step C is completed; and the step E2 is carried out after the injected filling materials in the step E1 are completely cured.

And under the situation that the common additional frame or side frame is small, the step D is further divided into the sub-steps as follows:

D1. adjusting a middle connecting rod of the combined framework at two opposite sides after the combined framework is installed at the gap opening between the additional frame or side frame of the door/window and the hole, firstly adjusting the combined framework at two opposite sides so that one side edge of the framework in the combined framework abuts against the wall side face of a reserved hole on the wall, taking looseness-proof measures, and then tightly pressing the framework at the side to be sealed so that the framework is tightly attached to the side face of the additional frame or side frame of the door/window;

D2. after the step D1, continuously adjusting the frameworks at two other opposite sides in accordance with the way of the step D1, so that the frameworks at four sides seal the gaps around the door/window at one side.

In the step D1 and D2, the middle connecting rod connecting two opposite sides is additionally provided with a connecting rod length adjusting mechanism for adjusting the length of the connecting rod in order to meet the demands of holes with different sizes. The middle connecting rod is a two-section rigid connecting rod with one end being connected with the combined framework respectively and the other end being respectively provided with threads having opposite turning directions, and the connecting rod length adjusting mechanism is a connecting rod with two ends being respectively provided with internal threads having opposite turning directions and the middle being hollowed. The combined framework in the step D comprises forked fasteners and frameworks, and one face of the forked fastener is provided with an adjusting mechanism so that the frameworks tightly press the side face of the additional frame or side frame of the door/window. The combined framework in the step D is the framework with at least one planar surface. The frameworks in the step D are the wooden or steel-made frameworks.

Under the situation that the occulting bars are arranged in the middle, a clamping slot is arranged on the periphery of the common additional frame or side frame, the occulting bars are clamped in the clamping slot along the periphery of the common additional frame or side frame, and the occulting bars are ethylene propylene diene rubber watertight seal bars.

In the step B, the wall of the hole is provided with a connecting member comprising a clamping point for fixing the common additional frame or side frame. The filling material is injected into the gap between the building door/window hole and the common additional frame or side frame by means of mechanical pressure in the step E, and manual plastering is adopted in the post treatment of gap opening.

By adopting the above construction method, the present invention can increase caulking compactness between the building door/window hole and the common additional frame or side frame, prevent water seepage and leakage caused by poor manual caulking compactness, improve construction quality and working efficiency, guarantee the installation quality, safety and service life of the common additional frame or side frame in the building door/window hole, and enhances the safety and quality of building envelope structure of the building door/window. Furthermore, the present invention provides a plurality of solutions based on the characteristics in northern cold areas and southern areas of heavy rainfall and the characteristic of small thickness of the common additional frame or side frame, thus this construction method has better practicability and the caulking compactness is further improved, and the pressure injecting construction method provided by the present invention is also suitable for caulking gaps between side frame of curtain wall and wall.

DETAILED DESCRIPTION OF THE EMBODIMENTS

Description is made below to the embodiments of the invention with reference to the drawings.

Figure 1:
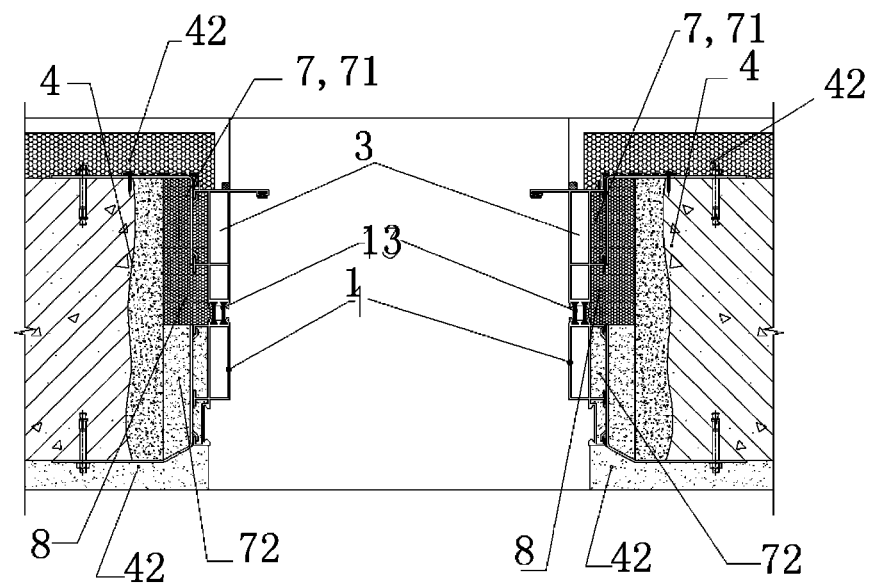
FIG. 1 is a schematic diagram of the caulking structure in accordance with the technique.

Shown as FIG. 1, the pressure injecting caulking construction technique for gaps between building door/window hole and common additional frame or side frame, provided by the present invention comprises the steps as follows:

B, firstly, putting a common additional frame or side frame 1 of a building door/window in a building door/window hole 4, and accurately positioning the common additional frame or side frame 1 of the building door/window;

E, injecting a filling material 7 into a gap 3 between the building door/window hole 4 and the common additional frame or side frame 1 by means of mechanical pressure, and completing post-treatment of gap opening.

The present invention focuses on the fact that caulking is performed in a manner of injecting the filling material by mechanical pressure injecting equipment, thus the filling material is injected into all the spaces in the gap 3 under the action of pressure to avoid the generation of bubbles and spaces in the middle and improve the compactness of the filling material; the post-treatment of gap opening in the step E comprises surface smoothing or surface decoration of gap opening, and surface treatment and decoration for internal and external wall surfaces 42 and waterproof membranes 43 are completed by constructor after the operations in the present invention are finished. The present invention can increase caulking compactness between the building door/window hole 4 and the common additional frame or side frame 1, prevent water seepage and leakage caused by poor manual caulking compactness, improve construction quality and working efficiency, guarantee the installation quality, safety and service life of the common additional frame or side frame in the building door/window hole, and enhances the safety and quality of building envelope structure of the building door/window.

Shown as FIG. 1 to FIG. 4, heat insulating parts for indoor and outdoor temperature isolation are generally arranged between the building door/window hole 4 and the common additional frame or side frame 1, and in this case, the following step is carried out between the step B and the step E:

C, injecting middle isolation insulating materials in the middle of the gap between the common additional frame or side frame 1 and the hole in northern cold areas, and sequentially injecting the materials along the periphery of the common additional frame or side frame 1 to entirely complete filling operations so that a continuous middle isolation zone 8 is formed in the middle of the gap between the common additional frame or side frame 1 and the hole.

Shown as FIG. 7 to FIG. 10, water occulting devices are generally arranged between the building door/window hole 4 and the common additional frame or side frame 1 in southern areas of heavy rainfall, and aiming at the southern areas of heavy rainfall, the present invention provides the solution that the following step is carried out before the step B:

A. installing occulting bars on the periphery of the common additional frame or side frame 1 of the building door/window adjacent to the outer side of the common additional frame or side frame 1, wherein the occulting bars are continuously distributed along the periphery of the common additional frame or side frame 1. The common additional frame or side frame 1 is embedded into a predetermined position inside the gap from the outer side of the gap, and the occulting bars 2 distributed continuously divide the gap 3 between the common additional frame or side frame 1 and the gap into an outer side gap 31 and an inner side gap 32.

The present invention focuses on the fact that: firstly, caulking is performed in a manner of mechanical pressure injection, thus the filling material is injected into the gap under the action of pressure in order to enhance the compactness of the filling material and the compactness between the filling material and the gap; secondly, the occulting bars in the gap of the hole play the role of watertight seal at inner and outer sides of wall, thereby solving the problem of water seepage caused by poor caulking compactness. The construction technique of the present invention is especially suitable for areas of hot summer and warm winter, and particularly for building door/window in windy and rainy humid areas.

When the construction technique is implemented in the field, the injection of the filling material into the gaps between the inner and outer sides of the occulting bars 2 by means of mechanical pressure must be carried out in a stepwise manner. The occulting bar has certain flexibility and will deform under the action of external force, meanwhile, the uncured filling material has plasticity and also will deform if being stressed, so during construction, the injection of the filling material at the inner side is carried out after the filling material at the outer side is cured or semi-cured, as a result, the shaped filling material at the outer side can withstand certain pressure and is accordingly not liable to deform, guaranteeing caulking quality and appearance. Such a stepwise construction technique, which is characterized by centralized construction at the outer side of the common additional frame or side frame at first and then centralized construction at the inner side after the construction at the outer side is completed, is extremely suitable for the situation that personnel are inconvenient to get in and out frequently after the common additional frame or side frame has been installed on door/window.

In the step E of the construction technique, the filling material is cement mortar or caulking waterproof material.

The filling material can not only play the role of filling the gaps and fixing the common additional frame or side frame of door/window, but also has waterproof function, and this caulking waterproof material can also be a mixed material that is obtained by doping cement mortar with waterproof material or heat insulating material.

Figure 5:
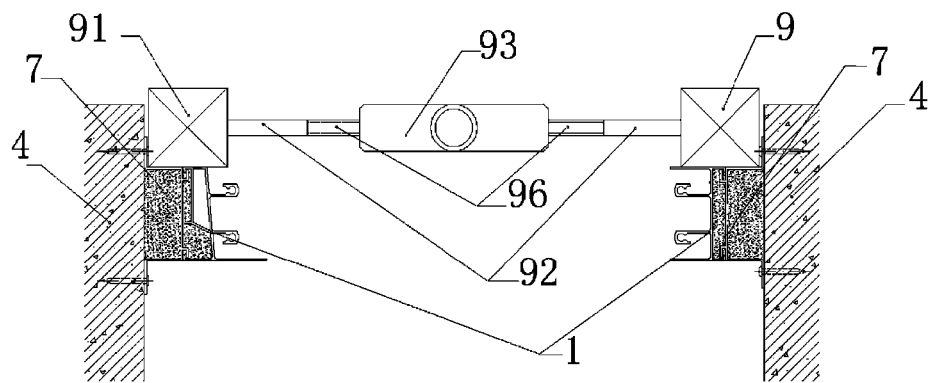
FIG. 5 is a schematic diagram of the one-time injection caulking structure in accordance with the technique.
Figure 6:
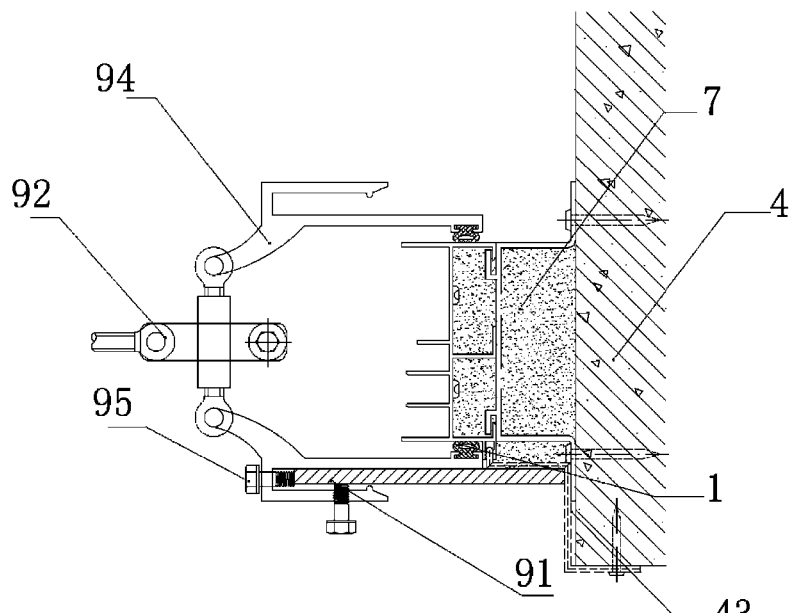
FIG. 6 is a schematic diagram of stepwise adjusting the frameworks.
Figure 7:
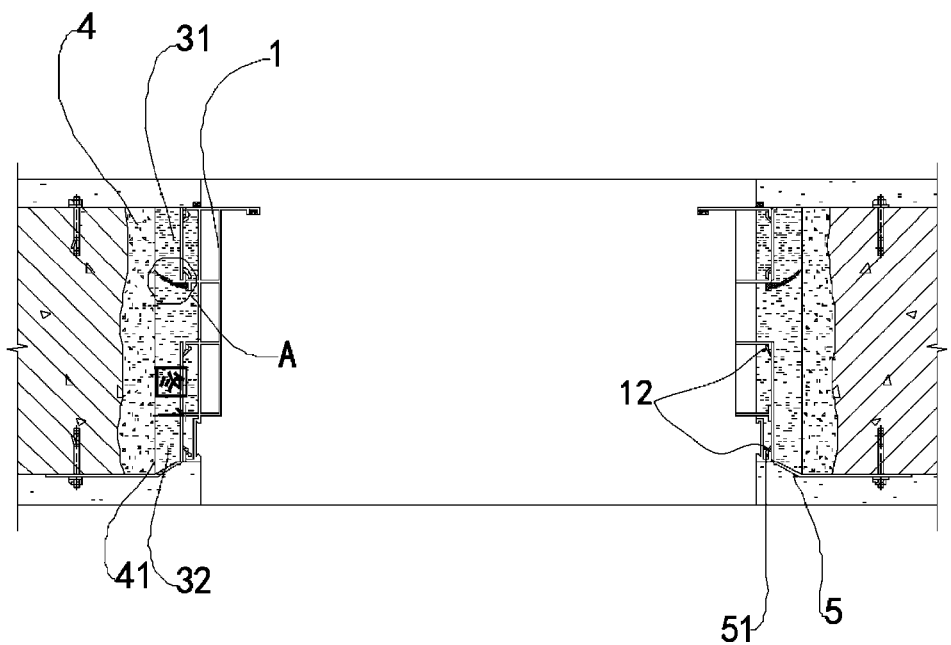
FIG. 7 is a structural schematic diagram of mechanical pressure injection at two sides with the occulting bars.
Figure 8:
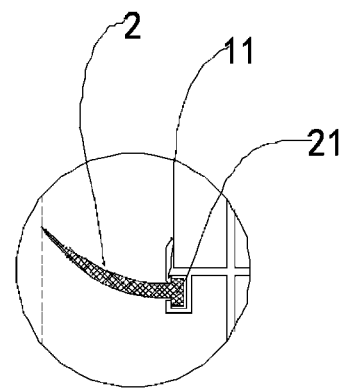
FIG. 8 is a magnified schematic diagram of Node A in FIG. 7.
Figure 9:
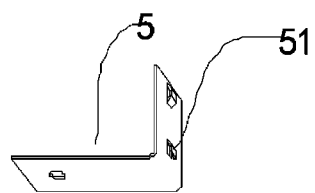
FIG. 9 is a structural schematic diagram of the connecting member.
Figure 10:
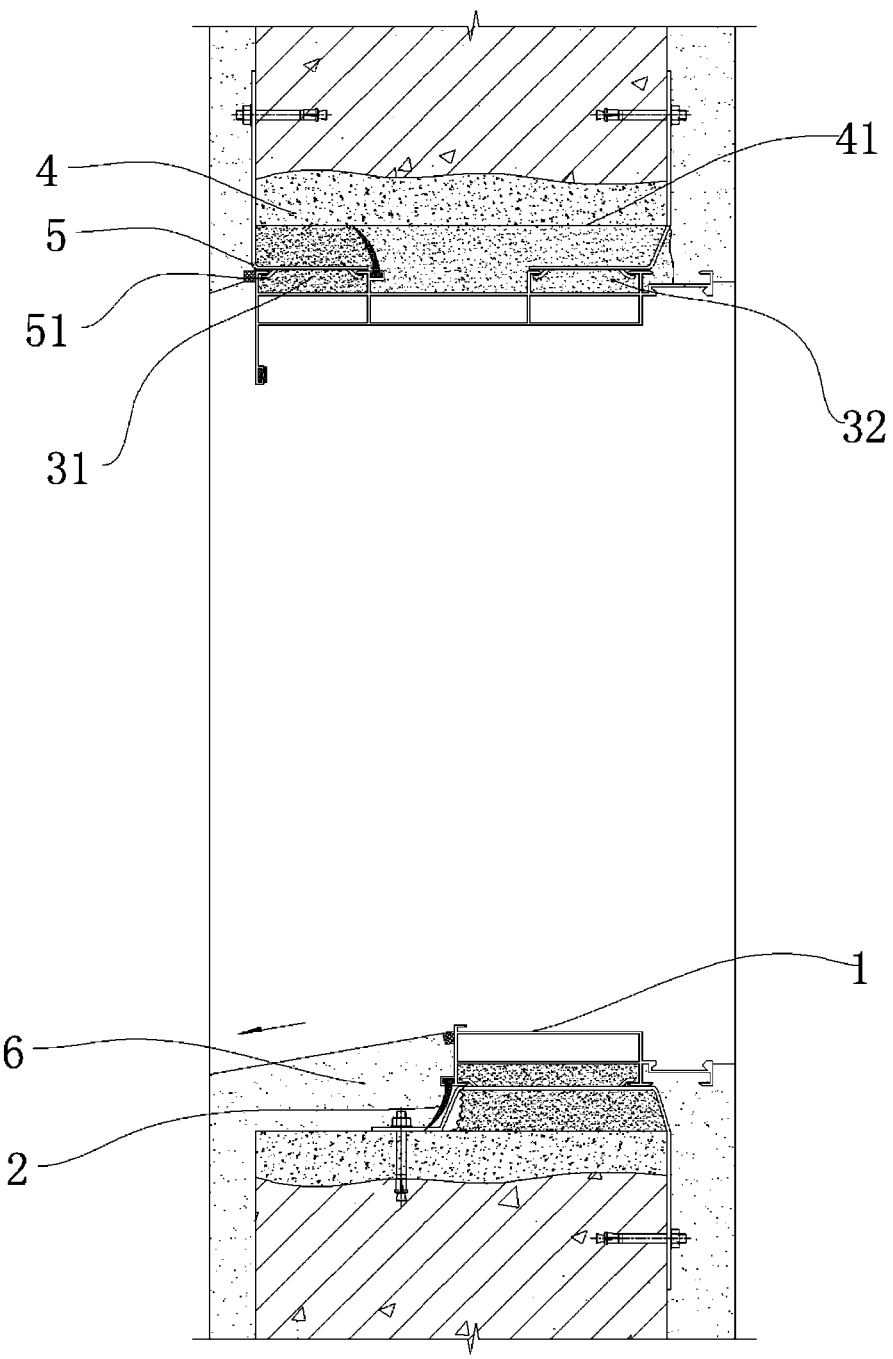
FIG. 10 is a structural schematic diagram of the combination of mechanical pressure injection and manual plastering.

Shown as FIG. 5 to FIG. 6, it is impossible to add heat insulating and waterproof mechanisms in the middle when the thickness of the common additional frame or side frame is small, so in this case, the present invention provides a solution that the following step is carried out after the step B:

D. installing a combined framework 9 on the sides of the additional frame or side frame 1 of the door/window and the wall of the hole 4, so that the edge of the framework 91 at one side of the combined framework abuts against the inner side face of a reserved hole on the wall and the inner side faces of the frameworks in the combined framework are attached to the outer side surface of the additional frame or side frame 1.

The following step is carried out after the step E:

F. dismantling the combined framework 9 after the filling material 8 is cured or semi-cured.

In the present invention, the gap 3 between the common additional frame or side frame of door/window and the hole is sealed off by the combined framework 9, and the filling material is then injected into the gap through a pressure injection machine, the compactness of the filling is high owing to pressure injection, thereby completely avoiding the phenomenon of space and false caulking that are unavoidable in manual plastering, and greatly improving the working efficiency and raising the construction quality.

The step D above is further divided into the sub-steps as follows:

D1. adjusting a middle connecting rod 92 of the combined framework at two opposite sides after the combined framework is installed at the gap opening between the additional frame or side frame 1 of the door/window and the hole 4, firstly adjusting the combined framework at two opposite sides so that one side edge of the framework in the combined framework abuts against the wall side face of a reserved hole 4 on the wall 41, taking looseness-proof measures, and then tightly pressing the framework 91 at the side to be sealed so that the framework is tightly attached to the side face of the additional frame or side frame of the door/window;

D2. after the step D1, continuously adjusting the frameworks at two other opposite sides in accordance with the way of the step D1, so that the frameworks at four sides seal the gaps around the door/window at one side.

In the step D1 and D2, the middle connecting rod connecting two opposite sides is additionally provided with a connecting rod length adjusting mechanism 93 for adjusting the length of the connecting rod in order to meet the demands of holes with different sizes; the middle connecting rod is a two-section rigid connecting rod with one end being connected with the combined framework respectively and the other end being respectively provided with threads 96 having opposite turning directions, and the connecting rod length adjusting mechanism is a connecting rod with two ends being respectively provided with internal threads having opposite turning directions and the middle being hollowed; the combined framework in the step D comprises forked fasteners 94 and frameworks 91, and one face of the forked fastener is provided with an adjusting mechanism 95 so that the frameworks tightly press the side face of the additional frame or side frame of the door/window. The combined framework in the step D is the framework with at least one planar surface. And the frameworks in the step D are the wooden or steel-made frameworks.

The pressure injection procedures for two sides in the step E of the present invention can be completed simultaneously, or can be completed stepwise, and description is made below to the proposals of these two construction ways.

In the third proposal, the step E of injecting the filling material by means of mechanical pressure is completed at a time.

Figure 2:
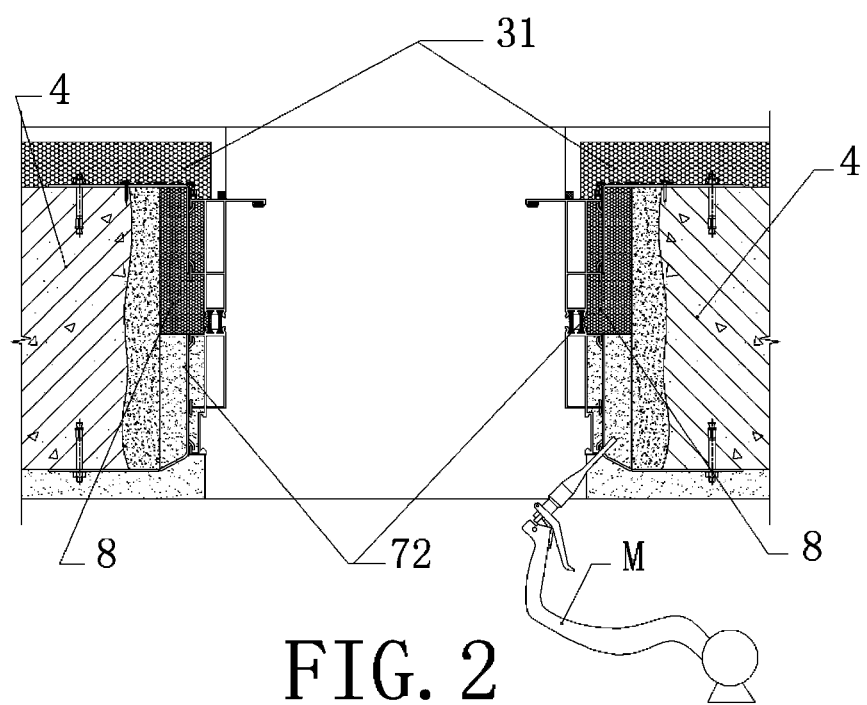
FIG. 2 is a schematic diagram of the first step in the stepwise injection of the filling material by means of mechanical pressure.
Figure 3:
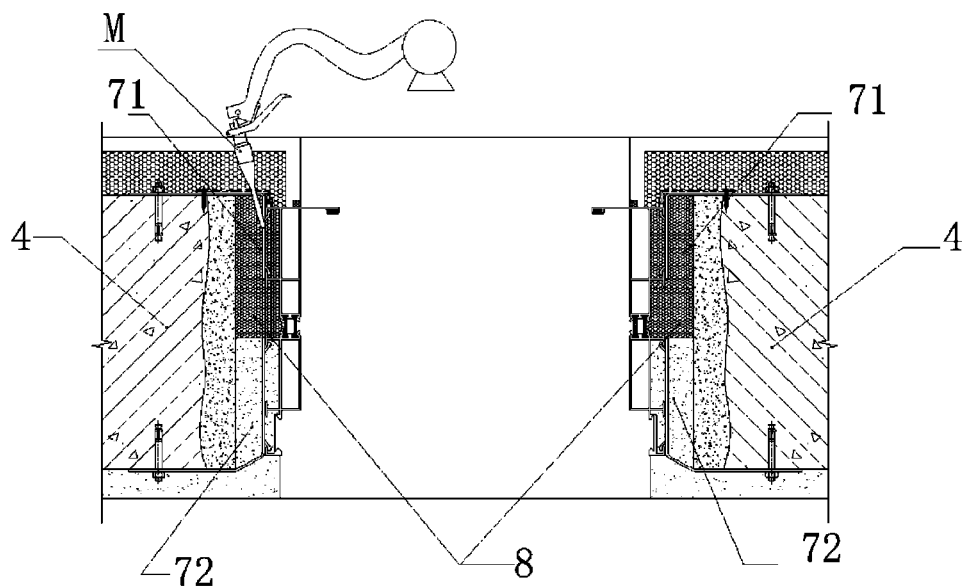
FIG. 3 is a schematic diagram of the second step in stepwise injecting of the filling material by means of mechanical pressure.

Shown as FIG. 2 and FIG. 3, aiming at the first and second proposals, the step E can be further divided into the sub-steps as follows:

E1, firstly, injecting the outer side filling material 71 by means of mechanical pressure into the gap 31 at one side of the middle isolation zone 8 in the step C or of the occulting bars in the step A, and completing post-treatment of the gap opening at this side;

E2, then, injecting the inner side filling material 72 by means of mechanical pressure into the gap 32 at the other side of the middle isolation zone 8 in the step C or of the occulting bars in the step A, and completing post-treatment of the gap opening at this side.

When the above method is used for onsite construction, centralized construction at the outer side of the common additional frame or side frame 1 of building door/window can be performed at first and then centralized construction at the inner side is performed after the construction at the outer side is completed, this method can facilitate construction under the situation that personnel are inconvenient to get in and out frequently after the common additional frame or side frame 1 has been installed on door/window.

Figure 4:
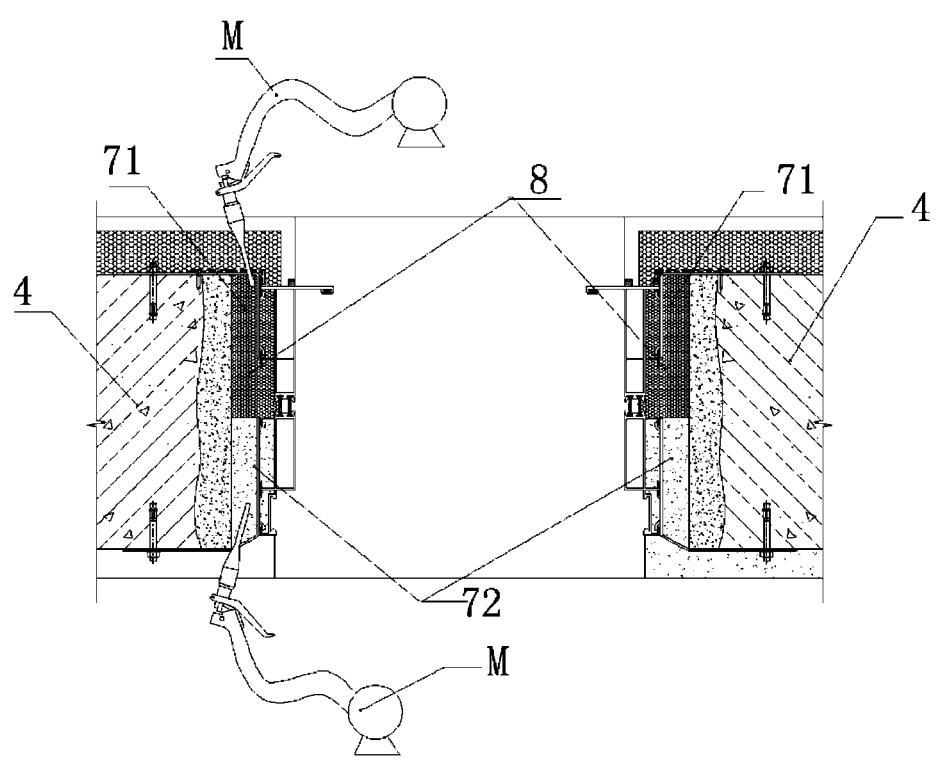
FIG. 4 is a schematic diagram of simultaneously injecting the filling material at two sides.

Shown as FIG. 4, in the step E, injecting the filling material by means of mechanical pressure at two sides of the middle isolation zone 8 in the step C or of the occulting bars in the step A can be completed simultaneously, and post-treatment of the gap openings at the two sides is simultaneously completed. Injecting the filling material by means of mechanical pressure in the step E is carried out after the middle isolation insulating material in the step C is cured, or injecting the filling material by means of mechanical pressure in the step E is carried out after the middle isolation insulating material in the step C is semi-cured. The step E1 is carried out immediately after the injection of the middle isolation insulating material in the step C is completed; and the step E2 is carried out after the injected filling material in the step E1 are completely cured.

In principle, the step E of the present invention is carried out after the middle isolation insulating material is cured, but regulations based on specific condition are acceptable in accordance with different onsite construction conditions or different construction progress demands.

The first construction method provided is as follows: injecting the filling material by means of mechanical pressure in the step E is carried out after the middle isolation insulating material in the step C is completely cured. This construction method can guarantee relatively good construction quality, and is relatively suitable for those fast cured middle isolation insulating materials, e.g. foaming insulating waterproof filling material is used as the middle isolation insulating material.

The second construction method provided is as follows: injecting the filling material by means of mechanical pressure in the step E is carried out after the middle isolation insulating material in the step C is semi-cured. This construction method requires accurate judgment on the pressure that the middle isolation insulating material can withstand, and on condition that the middle isolation insulating material can withstand pressure injection at single side, the pressure injection caulking procedure for two sides can also be performed when the middle isolation insulating material is semi-cured.

The third construction method provided is as follows: this method can be only suitable for stepwise caulking at two sides, the step E1 is carried out immediately after the injection of the middle isolation insulating material in the step C is completed, and the step E2 is carried out after the injected filling material in the step E1 are completely cured. This method requires that the middle isolation insulating material has certain strength, the step E1 which is carried out simultaneously requires regulations for both injection pressure and injection procedure, e.g. the method of stepwise injection filling from inside to outside is adopted.

Simultaneous construction in the proposal not only comprises the simultaneous construction at two sides, but also means that waiting for the curing of the material is unnecessary after the injection at one side is completed, so that the construction at the other side is performed. This construction method is adopted under the situation that personnel can get in and out easily after the common additional frame or side frame 1 is installed on building door/window, and can be completed in a centralized manner to avoid frequent movement of mechanical equipment.

The middle isolation insulating material in the step C is insulating waterproof material, which further is foaming insulating waterproof filling material. The caulking adopting such a structure is suitable for cold areas and severe cold areas, and the heat insulating material in the middle is connected with wall and broken bridges 13 to play the role of isolating cold and heat.

The filling material injected by means of mechanical pressure in the step E is cement mortar, or the filling material injected by means of mechanical pressure in the step B is caulking waterproof material. The filling material in the step E is cement mortar, or the filling material in the step B is caulking waterproof material, the filling material can not only play the role of filling the gaps and fixing the common additional frame or side frame 1 of door/window, but also has waterproof function, and this caulking waterproof material can also be a mixed material that is obtained by doping cement mortar with waterproof material or heat insulating material.

Shown as FIG. 7 to FIG. 10, in the step A, a clamping slot is arranged on the periphery of the common additional frame or side frame 1, and the occulting bars are clamped in the clamping slot along the periphery of the common additional frame or side frame 1. The occulting bars are ethylene propylene diene rubber watertight seal bars. In the step B, the wall of the hole is provided with a connecting member comprising a clamping point for fixing the common additional frame or side frame 1.

In the step A of the construction technique, a clamping slot 11 is arranged on the periphery of the common additional frame or side frame 1, and the common additional frame or side frame is provided with a connecting part 21 in a manner of being matched with the clamping slot on the occulting bar 2, the connecting part 21 is accommodated in the clamping slot 11, thus the connecting part 21 is free from displacement when the occulting bar 2 is stressed. The occulting bars 2 are sequentially clamped in the clamping slot 11 along the periphery of the common additional frame or side frame 1.

The common additional frame or side frame 1 is firstly fixed on the wall 4, and then on the basis of the common additional frame or side frame 1, relevant components of door/window are installed, therefore, the installation and replacement of the relevant components are more convenient.

In the step B of the construction technique, the wall 4 of the hole is provided with a connecting member 5 comprising a clamping point 51 for fixing the common additional frame or side frame 1; the common additional frame or side frame 1 is provided with a clamping strip 12 in a manner of being matched therewith, the clamping strip is clamped in the clamping point 51 and used for fixing the common additional frame or side frame 1. When the common additional frame or side frame 1 is embedded into the hole, the clamping strip is clamped at a proper position of the clamping point 51, thus the common additional frame or side frame is fixed.

The occulting bars in the present invention are ethylene propylene diene rubber watertight seal bars having certain hardness and elasticity, the occulting bars 2 are in lap joint with the inner wall 41 of the hole when the common additional frame or side frame 1 is embedded, playing the role of sealing between the inner wall 41 of the hole and the common additional frame or side frame 1 and separating the inner and outer sides of the gap, meanwhile, when the filling material is injected at the outer side by means of mechanical pressure, the occulting bars 2 can withstand certain pressure without being separated from the inner wall 41 of the hole.

The filling material is injected into the gap between the building door/window hole 4 and the common additional frame or side frame 1 by means of mechanical pressure in the step E, and manual plastering is adopted in the post treatment of gap opening.

The filling material can be injected into the gap at the outer side in the step E completely by means of mechanical pressure, or partially by mechanical pressure in combination of manual plastering. Shown as FIG. 8, below the common additional frame or side frame 1, the occulting bar 2 is fixed at the outer side of the common additional frame or side frame 1, thus the gap opening at the outer side only requires the plastering on a drainage slope 6.

In the step E2 of the construction technique, injecting the filling material by means of mechanical pressure is carried out after the filling material injected by means of mechanical pressure in the step E1 is cured, and this construction method can guarantee relatively good construction quality.

Injecting the filling material by means of mechanical pressure in the step E1 can also be carried out after the filling material injected by means of mechanical pressure in the step E2 is semi-cured, and this construction method needs to determine that, under the situation that the filling material at the outer side is semi-cured, the injection of the filling material at the inner side can be performed only when the occulting bars and the filling material at the outer side can withstand the pressure injection at the inner side.

The above-noted "means of mechanical pressure" refers to an injection tool M designed to apply mechanical pressure to the filling material to thereby inject the filling material into a desired location. These injection tools, such as but not limited to hand pump activated injectors or trigger activated compressed or mechanically pressurized delivery systems, are known in the construction arts so further details are not provided herein.

By adopting the above innovative construction technique, the present invention can improve caulking compactness, prevent false caulking and raise construction quality and working efficiency.

INDUSTRIAL USE

The mechanical pressure injecting caulking construction method of the present invention belongs to the construction methods in the field of building construction and can be widely applied to filling the gaps between building door/window and wall, and by adopting the above construction method, the present invention can increase caulking compactness between the building door/window hole and the common additional frame or side frame, prevent water seepage and leakage caused by poor manual caulking compactness, improve construction quality and working efficiency, guarantee the installation quality, safety and service life of the common additional frame or side frame in the building door/window hole, and enhances the safety and quality of building envelope structure of the building door/window. Furthermore, the present invention provides a plurality of solutions based on the characteristics in northern cold areas and southern areas of heavy rainfall and the characteristic of small thickness of the common additional frame or side frame, thus this construction method has better practicability and the caulking compactness is further improved, and the pressure injecting construction method provided by the present invention is also suitable for caulking gaps between side frame of curtain wall and wall.

The contents described above pertains to further detailed description made to the present invention with reference to the preferred embodiments, and could not be considered as the limitation to the embodiments of the present invention. Many simple modifications or alternatives, made by ordinary skilled in this art of the present invention without departing from the concept of the present invention, shall be contemplated as being within the scope of the present invention.

What is claimed is:

1. A pressure injecting caulking construction technique for gaps between building door/window hole and common additional frame or side frame, comprising the steps as follows:
    A. firstly, installing a common additional frame or side frame of a building door/window in a building door/window hole, and positioning the common additional frame or side frame of the building door/window;
    B. installing a combined framework on the sides of the additional frame or side frame of the door/window and a wall defining the boundary of the hole, so that the edge of the framework at one side of the combined framework abuts against an inner side face of a reserved hole on the wall and the inner side faces of the frameworks in the combined framework are attached to an outer side surface of the additional frame or side frame,
    wherein the combined framework in step B comprises forked fasteners and frameworks, the forked fasteners having multiple points, and one face of the forked fastener is provided with an adjusting mechanism so that the frameworks tightly press against the side face of the additional frame or side frame of the door/window;
    C. injecting a filling material into a gap between the building door/window hole and the common additional frame or side frame using mechanical pressure; and
    D. dismantling the combined framework after the filling material is cured or semi-cured.

2. A pressure injecting caulking construction technique for gaps between building door/window hole and common additional frame or side frame, comprising the steps as follows:
    A. firstly, installing a common additional frame or side frame of a building door/window in a building door/window hole, and positioning the common additional frame or side frame of the building door/window;
    B. installing a combined framework on the sides of the additional frame or side frame of the door/window and a wall defining the boundary of the hole, so that the edge of the framework at one side of the combined framework abuts against an inner side face of a reserved hole on the wall and the inner side faces of the frameworks in the combined framework are attached to an outer side surface of the additional frame or side frame, wherein the frameworks in step B are wooden or steel-made frameworks;

C. injecting a filling material into a gap between the building door/window hole and the common additional frame or side frame using mechanical pressure; and D. dismantling the combined framework after the filling material is cured or semi-cured.

3. A pressure injecting caulking construction technique for gaps between building door/window hole and common additional frame or side frame, comprising the steps as follows:

A. firstly, installing a common additional frame or side frame of a building door/window in a building door/window hole, and positioning the common additional frame or side frame of the building door/window;

B. installing a combined framework on the sides of the additional frame or side frame of the door/window and a wall defining the boundary of the hole, so that the edge of the framework at one side of the combined framework abuts against an inner side face of a reserved hole on the wall and the inner side faces of the frameworks in the combined framework are attached to an outer side surface of the additional frame or side frame, wherein the combined framework in step B comprises forked fasteners and frameworks, the forked fasteners having multiple points, and one face of the forked fastener is provided with an adjusting mechanism so that the frameworks tightly press against the side face of the additional frame or side frame of the door/window, wherein the combined framework is the framework with at least one planar surface;

C. injecting a filling material into a gap between the building door/window hole and the common additional frame or side frame using mechanical pressure; and D. dismantling the combined framework after the filling material is cured or semi-cured.

\* \* \* \* \*